United States Patent [19]

Jamet

[11] Patent Number: 4,461,842

[45] Date of Patent: Jul. 24, 1984

[54] CERAMIC COMPOSITE MATERIALS WITH HIGH MECHANICAL AND HEAT RESISTANCE AND THEIR PREPARATION

[75] Inventor: Jean Jamet, Janvry, France

[73] Assignee: Office National d'Etudes et de Recherches Aerospatiales (Par Abreviation O.N.E.R.A.), France

[21] Appl. No.: 425,623

[22] Filed: Sep. 28, 1982

[30] Foreign Application Priority Data

Oct. 20, 1981 [FR] France .................. 81 19692

[51] Int. Cl.³ ............................................. C04B 35/80
[52] U.S. Cl. ...................................................... 501/95
[58] Field of Search .................. 501/95; 428/268, 273

[56] References Cited

U.S. PATENT DOCUMENTS

| 3,019,117 | 1/1962 | Labino | 501/95 |
|---|---|---|---|
| 3,752,683 | 8/1973 | Hawthorne | 501/95 |
| 4,252,588 | 2/1981 | Kratsch et al. | 156/73.6 |
| 4,284,664 | 8/1981 | Rauch | 428/273 |

FOREIGN PATENT DOCUMENTS

| 2136253 | 12/1972 | France | 428/273 |
|---|---|---|---|
| 1423167 | 1/1976 | United Kingdom | 501/95 |
| 2049751 | 12/1980 | United Kingdom | 428/273 |

*Primary Examiner*—James Poer
*Attorney, Agent, or Firm*—Larson and Taylor

[57] ABSTRACT

The invention relates to ceramized composite materials comprising a substrate formed of weavable ceramic fibres with high thermomechanical properties and a matrix formed from a ceramic oxide selected from the group comprising silica, chromic oxide and magnesium oxide, the cohesion of the oxide particles being such that it permits, under stress, microfissurization which progresses to the level of the fibres.

8 Claims, No Drawings

CERAMIC COMPOSITE MATERIALS WITH HIGH MECHANICAL AND HEAT RESISTANCE AND THEIR PREPARATION

FIELD OF THE INVENTION

The invention relates to a ceramized composite materials with high mechanical strength and heat resistance and to their preparation.

It relates, more particularly, to composite materials of the type obtained by the injection, into a reinforcing substrate of fibrous ceramic material, of a precursor compound for the ceramic material constituting the matrix of the structure.

PRIOR ART

It is known that ceramic-ceramic composites of this type are used in industry, in particular, for the development of parts which must withstand mechanical and/or heat stresses.

However, in these uses, the composites may be subjected to very vigorous attack.

One of the problems then encountered with known composites results from rapid deterioration of the structure accompanied by processes of splitting and cracking.

The interest of having available more effective materials has led Applicants to study substrate-matrix combinations capable of withstanding, for a limited time, generally less than an hour, stresses such as those which may be undergone by heatshields and, over long periods, various mechanical attacks at average temperatures of the order of 250° C.

The studies carried out have shown that by using for the substrates, materials with high resilience, and by forming matrices having relatively weak mechanical properties, it was possible to provide combinations enabling composites to be developed which were particularly effective with respect to the required exigences.

It was hence an object of the invention to provide ceramised composite materials having a wide spectrum of mechanical and thermal properties and possessing, in particular, a structural behavior.

It was also an object to provide materials which can be used, due to these properties, in an extended field of application relating, for example, both to the development of parts for aeronautics and engine elements.

It is also an object of the invention to provide a method of developing ceramised composite materials easy to apply and exploitable on an industrial scale.

GENERAL DESCRIPTION OF THE INVENTION

According to the invention there are provided ceramic-ceramic composites comprising a reinforcing substrate formed of weavable ceramic fibres into which there has been introduced, by injection by the liquid route a precursor of ceramic material for the purposes of developing a matrix occupying at least the major part of the free volume of the substrate.

These composites are characterized by a combination of a substrate formed of weavable ceramic fibres, with high thermo-mechanical properties, which have not undergone mechanical or chemical alterations, and a matrix formed from a ceramic oxide selected from the group comprising silica ($SiO_2$), chromic oxide ($Cr_2O_3$) and magnesium oxide (MgO), the cohesion of the oxide particles being such that it enables, under stress, a microfissurization which advances up to the level of the fibres.

It will be observed that with a structure of this type, when the composite is subjected to thermo-mechanical attacks, the oxide particles, due to the fact of their weak cohesion, will be able advantageously to dampen the stresses, by friction, and thus to avoid, all or at least to reduce considerably, the fissurization of the reinforcement.

In a preferred embodiment of the invention, the matricial oxide is not sintered and hence shows relatively weak mechanical properties.

The application, in combination, on the one hand of such a non-sintered matrix, with weak mechanical properties, and on the other hand, of a fibrous reinforcing substrate with high thermo-mechanical properties, then enables benefit to be derived from the properties of resilience of the fibrous reinforcement used.

These composites will then be used with advantage for the constitution of engine parts, of bases, or of heatshields. According to a preferred embodiment of the invention, the fibres of the substrate show a multi-directional architecture, advantageously three-dimensional, which excludes a privileged direction of fissurization and leads to composites with a structural behavior of high performance.

According to the mode of stressing anticipated, the directional reinforcement ratios will be different.

The ratio by volume of fibres is advantageously of the order of 40–50 percent so that the substrate is still deformable during a possible molding into shape.

Preferred reinforcing ceramic fibres are selected from the group comprising silica fibres, silicon carbide, alumina, and similar fibres possessing considerable mechanical properties at high temperature and non-oxidizable.

Besides the advantage of high resilience, these fibres prove to be remarkably satisfactory as regards their compatibility with the oxide of the matrix. A fibre-matrix adhesion of the mechanical type particularly favorable in the case of high temperature use is also observed.

According to an advantageous feature of the invention, the above-defined composites include at least one second matrix, or supermatrix, capable of reinforcing the cohesion of the matricial material mentioned above and the fibre-matrix bonds in the field of thermostability of the material used for the development of the supermatrix.

This modification based on the application of several associated matrices to reinforcing substrates with high resilience leads to composites with a structural behavior during long periods, in the field of thermostability of the polymer, and possessing remarkable strength, at the time of oxidizing thermomechanical attack, due to the simultaneous and permanent existence of the fibre and of the ceramic part of the matrix.

Under the effect of aggresion, there is observed, in the first moments, a combustion of the organic part of the matrix, then sintering of the matricial ceramic capable of assuming mechanical stress sufficiently to ensure the necessary survival of the composites.

These composites of the supermatrix type prove to be advantageously capable of withstanding for a limited period (for about 3 minutes) mechanical and/or thermal loads at temperatures which can exceed 1000° C. in an oxidizing environment. These composites are hence particularly suitable for constituting structural elements which can be subjected to very severe aggressions, in particular, parts of little thickness, with a large surface area, which have to operate in an acoustic environment of very high intensity of a nature such as to induce damage through fatigue.

Among applications of this type, may be mentioned uses as heatshields in an engine environment.

The material of the supermatrix is advantageously constituted by an organic polymer such as phenolic or a polystyrylpyridine polymer, the proportion by weight being from 5 to 10% of the supermatrix in the final composite.

The invention is also directed to a method of developing ceramic-ceramic composites by injection into a reinforcing substrate formed from ceramic fibres, of a precursor, in the liquid state, of ceramic material, in order to form a ceramic matrix.

This method is characterized by the fact that:

a: the injection step is carried out under vacuum with a substrate formed from weavable ceramic fibres, with high thermo-mechanical properties, and a matrix precursor, in liquid form, constituted by a compound capable, by pyrolysis, of leading to an oxide selected from the group comprising $SiO_2$, $Cr_2O_3$, or $MgO$;

b: the whole is subjected to pressure and temperature conditions enabling homogeneous filling of the major portion of the free space of the substrate by the precursor and the conversion in situ of the precursor into one of the above-defined ceramic oxides, this conversion being effected so as to lead to a ceramic material with weak mechanical properties, of which the cohesion of the particles must permit, under stress, a microfissurization which progresses to the level of the fibres, and to ensure the mechanical integrity of the fibres, these steps (a) and (b) being if necessary repeated until a composite is obtained possessing the desired density.

According to a preferred embodiment of the injection step (a), there is applied, at ambient temperature, a precursor in aqueous solution, in suspension, or molten whose viscosity does not exceed about 100 poises.

As precursor of the oxides constituting, according to the invention, the ceramic matrix, namely $SiO_2$, $Cr_2O_3$, or $MgO$, there is respectively applied colloidal silica, chromic anhydride ($Cr_2O_3$) or hydrated magnesium nitrate ($Mg(NO_3)_2 \cdot 2H_2O$).

In the case of a precursor constituting a suspended particulate solid phase like colloidal silica, the particle sizes are advantageously less than or equal to a tenth of the diameter of the fibre.

To carry out the ceramization step according to (b), in order to preserve the mechanical integrity of the fibres and thus to develop all their potential in the final composite, the conversion of the precursor is carried out at temperatures not exceeding 550° C., and it is done at atmospheric pressure.

As already indicated, according to a preferred embodiment of the invention, the ceramization is carried out so as to avoid sintering of the ceramic material. (By sintered condition is meant that which corresponds to an optimal densification of the material by heat treatment alone.)

It will however be noted that certain fibres such as silicon carbide fibres can allow processing temperatures of about 1200° C.

According to an additional feature of the method of the invention, in order to develop composites comprising at least one supermatrix, there is injected, under vacuum, into the ceramized composite, such as obtained at the end of step (b), a product in the liquid state, constituted by an organic resin such as defined above, then conditions of temperature and the pressure are established enabling respectively the conversion of the ceramic precursor, or ceramization, the polymerization of the resin and leading to good fatigue behavior of the material.

According to a preferred embodiment of the method of the invention, a multidirectional reinforcing substrate is applied, formed from ceramic fibres with high thermo-mechanical properties, such as fibres of C Si or $Al_2O_3$.

To ensure homogeneous penetration of the precursor, the substrate is subjected to a socalled fibre-matrix bonding treatment in order to remove textoplastic agents used for the weaving of the substrate.

Before proceeding with the injection of the precursor, the substrate is then left under vacuum for a sufficient time to remove volatile compounds which it may contain and which would interfere with the injection.

To form a ceramic matrix of $SiO_2$, $Cr_2O_3$ or $MgO$, a vessel containing the fibrous substrate is filled, by injection under vacuum, respectively with a colloidal silica suspension, with a molten mass or aqueous solution of $Cr_2O_3$, or with a molten mass of hydrated magnesium nitrate.

The substrate is left to be impregnated with the precursor under atmospheric pressure and the conditions are established enabling the conversion in situ by pyrolysis of the precursor used, into oxide corresponding to the above-defined characteristics.

With the particular substrate-matrix combinations indicated above, it appears advantageous to carry out this conversion under atmospheric pressure at temperatures not exceeding about 200° C. in the case of the formation of $SiO_2$ and of $Cr_2O_3$, and 350°–400° C. for the formation of $MgO$.

In the first stage, temperatures below 100° C. are applied, to remove water and volatile compounds under controlled conditions, thereby avoiding their boiling.

Under these conditions, the mechanical integrality of the fibres is preserved and fibre-matrix adhesions of good quality are obtained, which leads to ceramized composites possessing mechanical strength of great advantage.

For longterm operation, at average temperature (250° C.), at least one supermatrix is formed on the ceramized composite obtained.

To this end, into a vessel containing the ceramized composite is injected an organic resin, advantageously a phenolic or polystyrylpyridine resin, from which has been previously removed volatile products capable of beginning to boil at the moment of injection under vacuum and of initiating a foaming phenomenom.

The vessel containing the ceramized composite as well as the reserve of material to be injected are heated and then a pressure above atmospheric pressure, of the order of 3 to $5 \times 10^5$ Pa, is applied.

The polymerization of the resin under these controlled conditions is carried out by applying temperature levels which progress enabling first the removal of the volatile products, the gelling of the resin and then its polymerization.

To form the matrix, an aqueous solution of chromic anhydride (160 g of $Cr_2O_3$ in 100 g of water) or of molten $Cr_2O_3$ was used.

After the injection operation, the substrate was placed in a metal mold having previously undergone chromaluminization and subjected to a temperature of 550° C. for 4 hours.

These injections and heat treatment operations were repeated twice more.

The composite obtained had very good mechanical behavior, its porosity was of the order of 30 to 32% but the cohesion of the matrix was satisfactory and the adhesion to the fibres considerable (by reason of the highly oxidizing reaction applied, which comes into action in the liquid phase). The density was 2.40 g/cm$^3$.

The overall yield by volume and by weight of densification was as follows:

| | | |
|---|---|---|
| in solution | →η v = | 24% |
| | →η p = | 47.5% |
| in fusion | →η v = | 39.4% |
| | →η p = | 76% |

The production of the supermatrix of phenolic polymer or of PSP was carried out according to Example 2.

The composite obtained had the following characteristics:

(1) its mechanical bending strength was 200 MPa;
(2) its mode of rupture was still very largely resilient. It underwent deformation of about 6% in bending before final rupture;
(3) without any mechanical support (disc of 100 mm in diameter), it withstands the same aggression as that described for Example 1;
(4) without any mechanical support, it withstands fully the heat and the mechanical shock of the flame-torch.

EXAMPLE 3-Manufacture of a $SiO_2$ fibre-MgO matrix composite

Procedure was as in Example 1 employing hydrated magnesium nitrate.

The pyrolytic decomposition was carried out at 340° C. The overallyields by volume and by weight of densification was respectively 12.3 and 21%.

In this case also, good quality fibre-matrix adhesions were obtained, while preserving the mechanical integrality of the fibres.

EXAMPLE 4-Production of a CSi fibre-$SiO_2$ matrix-phenolic or PSP supermatrix composite.

Procedure is as in Example 1A, but a matrix bonding treatment was carried out on the starting fibrous substrate before the injection operation.

By this treatment, the organic oilings of the fibre (acrylic) are burnt in air at 600° C.

Injections of $SiO_2$ follow, by operating as in Example 1A. These injections are advantageously fixed at three in number.

The production of the phenolic or PSP polymer supermatrix is carried out as in Example 1B.

The composite obtained has the following characteristics;

its mechanical bending strength is 370 MPa. This composite is very resilient. A sag of 2 mm to damage point and of 7 mm before total rupture on a three point flexure specimen (length of specimen 50 mm; ratio length-height 10);

without any mechanical support, it fully withstands heat and mechanical shock from the impact of the flame-torch.

I claim:

1. In ceramized composite materials comprising a reinforcing substrate formed of weavable ceramic fibres, with high thermomechanical properties, which have not undergone mechanical or chemical alteration, into which there has been introduced, by injection by the liquid route, a ceramic material precursor for the purpose of developing a matrix occupying at least the major part of the free space of the substrate, said matrix being formed from a ceramic oxide selected from the group consisting of silica ($SiO_2$), chromic oxide ($Cr_2O_3$) and magnesium oxide (MgO), and the cohesion of the oxide particles being such that it permits, under stress, a microfissurization which progresses to the level of the fibres, the improvement consisting in that they comprise at least one second matrix, or supermatrix constituted by an organic polymer, capable of reinforcing the cohesion of the matricial material, and the fibre-matrix bonds in the field of thermostability of the material used for the development of the supermatrix.

2. Materials according to claim 1, wherein the ceramic fibres of the substrate have a multidirectional architecture, with different directional reinforcing ratios.

3. Materials according to claim 1, wherein the ceramic fibres are selected from the group consisting of quartz silica, silica, silicon carbide and alumina fibres.

4. Materials according to claim 2, wherein the ceramic fibres are selected from the group consisting of quartz silica, silica, silicon carbide and alumina fibres.

5. Materials according to any one of claims 1 to 4, wherein the organic polymer is a phenolic polymer or a polystyrenepyridine.

6. Method of producing ceramized composite materials by injection into a reinforcing substrate formed of ceramic fibres of a precursor, in the liquid state, of ceramic material, in order to develop a ceramic matrix, which comprises:

(a) conducting the injection step under vacuum with a substrate formed from weavable ceramic fibres, with considerable thermomechanical properties, and a matrix precursor, in liquid form, constituted by a compound capable, by pyrolysis, of resulting in an oxide selected from the group consisting of $SiO_2$, $Cr_2O_3$, or MgO;

(b) subjecting the whole to conditions of pressure and temperature enabling homogeneous filling, at least of the major part of the free space of the substrate, by the precursor, and the conversion in situ of the precursor into one of the above-defined ceramic oxides, this conversion being carried out so as to lead to a ceramic material with weak mechanical properties, of which the cohesion of the particles must permit, under stress, microfissurization to the level of the fibres, and ensure the mechanical integrity of the fibres; these steps (a) and (b) being as necessary repeated until the production of a composite possessing the desired density, said method comprising the additional step according to which a material, in the liquid state, constituted by an organic resin, is injected, under vacuum, into the ceramized composite as obtained after step (b),

DESCRIPTION OF PREFERRED EMBODIMENTS

Other features and advantages of the invention will appear in the description of the Examples which follow, given purely by way of nonlimiting illustration.

EXAMPLE 1-Manufacture of a ceramized silica fibre-silica matrix-phenolic polymer supermatrix composite.

(A)-Preliminary preparation of the ceramized composite.

This preparation is carried out according to the following steps:
1-pretreatment of the fibrous substrate used to facilitate the fibre-matrix bonding;
2-injection of a colloidal silica suspension and heat treatment for the purposes of forming a silica matrix.

These steps are carried out as follows:
1-pretreatment of the fibrous substrate:

A plate of silica fibres (quartz and Roving type silica) woven tridirectionally in the directions X, Y and Z, X and Y corresponding to the principal directions is used. The ratio by volume of fibres of the substrate is about 45% to 46%. The thickness, directional ratios and dimensions of the substrate as regards X, Y and Z are given below.

|  | Thickness (mm) | Direction ratio (%) | Dimensions (mm) |
|---|---|---|---|
| At X | 2 | 40 | 220 |
| At Y | 2 | 40 | 110 |
| At Z | 1.5 to 1.8 | 20 | 5 |

The substrate is left to stand for about ten hours, in boiling de-ionized water, in order to remove the textoplastic agents used for weaving. The substrate is then dried in an oven at 90° C. for five hours.

2-formation of a silica matrix by injection of a colloidal silica suspension, followed by a heat treatment.

injection

The substrate is placed in a narrow vessel, open at its upper part, and it is left to stand for three hours in an enclosure under vacuum ($13 \times 10^5$ Pa). Still operating under vacuum, into the vessel is introduced a colloidal silica suspension, until the level of the substrate is largely exceeded. It amounts to a 40% suspension of colloidal silica, having a particle size of the order of 250 Å (such as that marketed by Dupont and Nemours under the trademark LUDOX A5 40). The enclosure is then replaced under atmospheric pressure, for the purposes of penetration of the silica in suspension into the substrate. After a period of one hour, the substrate is recovered and placed in a mold and the whole is subjected to heat processing. This processing is carried out in two stages with firstly heating to 60° C. over 15 hours, then to 150° C. for 4 hours. This succession of operations, of injection and of heat treatment, is repeated twice. Each time, at the end of the heat treatment, the impregnated substrate is extracted from the mould and it is introduced immediately into a vessel such as mentioned above.

In this way a silica-silica composite is obtained possessing good mechanical strength, in which the fibres have not undergone any mechanical alteration and the matricial silica is not sintered. Under the conditions used, a partial condensation of the hydroxyl radicals of the silica is obtained, which confers sufficient cohesion on the matrix. The porosity of the silica is of the order of 20% and its cohesion is low. The density of the composite is from 1.6 to 1.7 g/cm$^3$.

(B)-Development of the phenolic polymer supermatrix.

A phenolic resin of the RA 101RP type, (marketed by RHONE POULENC) previously heated to 40° C. under vacuum in order to eliminate volatile products capable of coming to boiling point at the moment of injection under vacuum, was employed. The resin injection into the impregnated substrate obtained at the end of Example 1 then followed, operating as in this Example but heating the vessel containing the substrate and the resin tank to 40° C. and applying a pressure of $4 \times 10^5$ Pa for one hour.

The polymerization of the resin was then carried out by operating in the initial mold treated previously with an antiadhesive such as that marketed under the trademark VARLON. The mold was placed in a ventilated oven and subjected to the following heat cycle:
4 h at 60° C.
4 h at 80° C.
17 h at 90° C.
4 h at 130° C.
15 h at 170° C.

This operation resulted in a silica-silica composite with a phenolic polymer supermatrix characterized by the following properties:

(1) its mechanical bending strength was 230-240 MPa;
(2) its mode of rupture is of the resilient type, it can undergo, in fact, a deformation of about 10% in bending before complete rupture;
(3) on condition of being supported mechanically (disc of 100 mm in diameter), it withstood well beyond 3 minutes as a heatshield subjection to a flame at 2000° K. and $3 \times 10^5$ Pa generating pressure and placed 30 cm from the origin (pipe neck 18 mm diameter) of this flame;
(4) finally, this material resisted perfectly the heat and mechanical shock arising on the impact of a torch flame (under stationary conditions).

As a modification, the supermatrix was manufactured by means of a polystyrylpyridine resin.

Procedure was as previously by removing under vacuum and at 100° C. the volatile products of the resin, then following with injection at 100° C. and the controlled polymerization cycle was carried out up to 250° C. The composite obtained had properties of the type indicated above. It will be noted in passing that a composite material formed from a silica substrate and a silica matrix which would have undergone a heat treatment of matrix sintering at 650° C. would not respond to the desired objects. In fact, sintering leads to premature degradation of the silica fibres and the composite has finally a nonresilient behavior.

EXAMPLE 2-Manufacture of a CSi fibre-Cr$_2$O$_3$ matrix-phenolic or PSP polymer supermatrix composite.

Procedure was as in the process of Example 1. As fibrous substrate, fibres of silicon carbide, such as those marketed by NIPPON CARBON under the trademark NICALON, was used. These fibres are woven threedimensionally.

then conditions of temperature and pressure enabling polymerization of the resin are established.

7. Method according to claim 6, wherein there is applied in step (a), at ambiant temperature, colloidal silica in aqueous suspension, chromic anhydride in aqueous solution or under fusion, or hydrated magnesium nitrate under fusion, the viscosity of the precursor not exceeding about 100 poises.

8. Method according to claim 6, wherein the pyrolytic conversion is carried out at temperatures not exceeding 550° C., operating at atmospheric pressure.

* * * * *